Oct. 17, 1950     G. H. DOWSING     2,526,546
ILLUSORY DISPLAY DEVICE
Filed Sept. 28, 1945
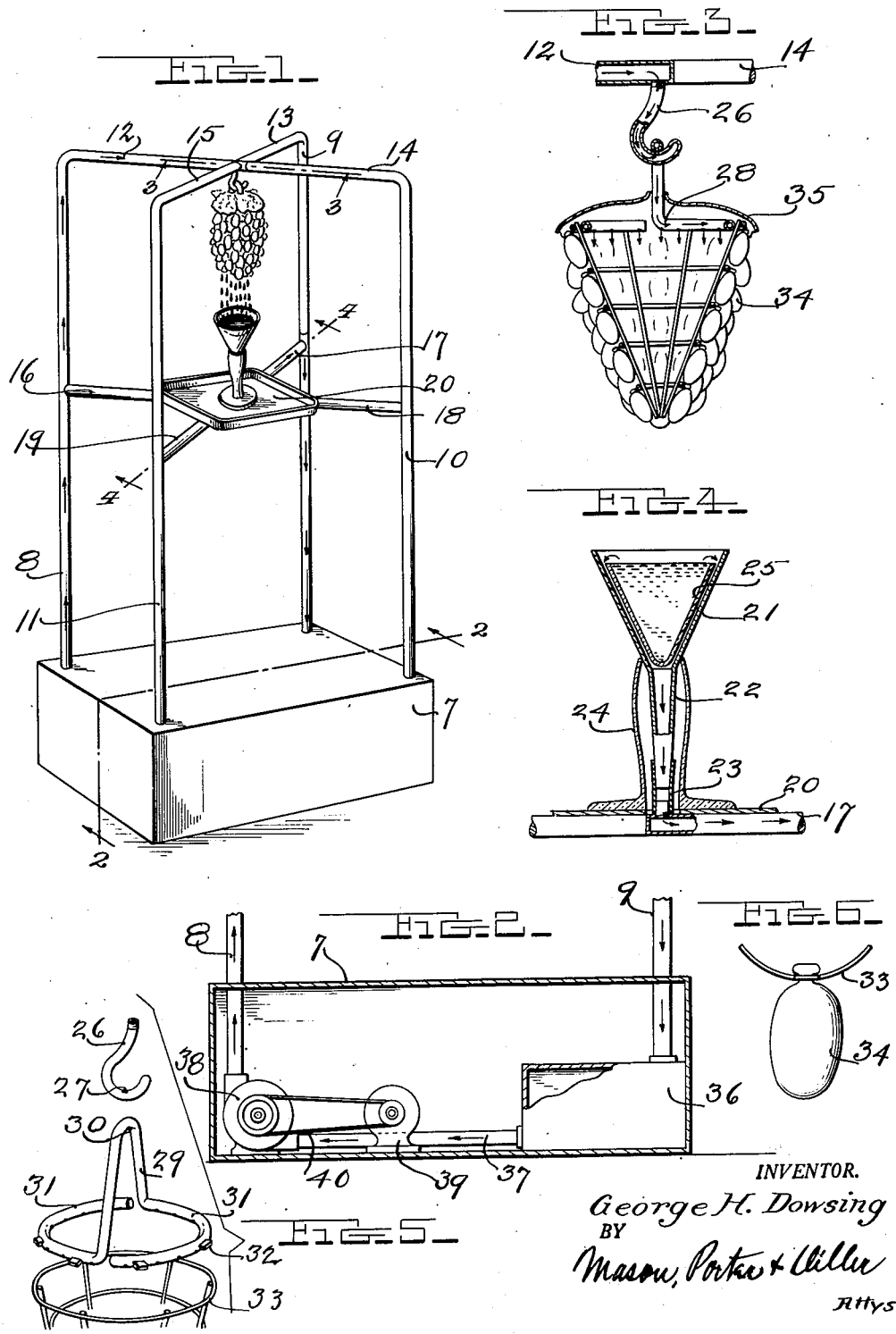
INVENTOR.
George H. Dowsing
BY
Mason, Porter & Miller
Attys.

Patented Oct. 17, 1950

2,526,546

UNITED STATES PATENT OFFICE 2,526,546

ILLUSORY DISPLAY DEVICE

George H. Dowsing, Seattle, Wash.

Application September 28, 1945, Serial No. 619,143

6 Claims. (Cl. 272—8)

The invention of which the following specification is a description deals with an illusory display device suitable for advertising purposes and the like where it is desired to attract the attention of the observer by mystifying him by creating an illusion.

The invention is broadly in that type of device which attracts the attention of the observer by producing a motion which appeals to his imagination and at the same time arouses his curiosity to account for the illusion which is presented. It is an improvement upon my prior patent granted by the Commonwealth of Australia Number 113,452.

It is an object of my invention to provide a device which will thus attract the attention of the observer and awaken his curiosity and puzzlement.

It is a further object of my invention to simulate and illustrate the extraction of juices from natural fruits.

Another object of my invention is to present the illusion of a constantly or intermittently renewed supply of the juice and its coloration and removal in an unobvious manner.

Among the objects of my invention is also that of simulating natural fruits such as a bunch of grapes from which the juice is caused to drip into a goblet or the like, the same being an object of definite decorative value.

Other objects of the invention will be understood from the following description of the preferred form.

As illustrating one embodiment of the invention, I have shown it in the accompanying drawings in which:

Fig. 1 is perspective view of my improvement in a display device having the effect of an illusion;

Fig. 2 is a vertical section of the base on the line 2—2 of Fig. 1;

Fig. 3 is a vertical section of the pendant and its suspension taken on the line 3—3 of Fig. 1;

Fig. 4 is a fragmentary vertical section of the receiver and its support taken on the line 4—4 of Fig. 1;

Fig. 5 is an exploded detail perspective of the pendant suspending means and

Fig. 6 is a side elevation of one of the pendant elements.

In order to form an attractive advertising device and at the same time mystify the observer, the invention relates broadly to an arrangement by which a clear liquid, which may be colored to represent natural fruit juices, appears to drip from the natural fruit, for example, a bunch of grapes, into a goblet at a constant or intermittent rate. The source of the dripping liquid is concealed as is also the method by which it is removed without causing overflow of the goblet into which it is received.

The general arrangement has been shown in perspective in Fig. 1 and is supported on a base 7 which is hollow for purposes to be explained later.

A frame of tubular posts is mounted upon the base 7 and may be suitably draped over the back and sides so that the frame is out of sight or inconspicuous. This frame consists of a series of two or more posts 8, 9, 10 and 11. While four have been shown, the operative features can be confined to the rear corner posts 8 and 9 which are hollow.

Post 8 has an integral top extension 12 running inward of the device. Similar top extensions 13, 14 and 15 extend inwardly from the upper ends of the posts 9, 10 and 11 respectively. Of these extensions, 12 is hollow and forms a continuation of the tubular post 8.

A series of intermittent cross bars 16, 17, 18 and 19 are provided in intersecting arrangement in a horizontal plane. The cross bars extend inwardly from posts 8, 9, 10 and 11 respectively. The cross bar 17 is a hollow tube and connects with the hollow tubular post 9. It is, of course, understood that cross bars 16 and 18 may be formed integrally as is also true of cross bars 17 and 19.

The cross bars form a support for a horizontal tray 20. Centrally mounted upon the tray 20 there is a funnel-shaped goblet 21. The stem 22 of this goblet is hollow having connections with an upstanding extension 23 of the discharge tube 17. A pedestal 24 surrounds the stem 22 of the goblet 21 and conceals the latter from view.

The goblet 21 contains cup 25 which is of the same general form but provided with exteriorly projecting means by which it rests a slight distance away from the wall of the goblet 21 and together with the latter provides a drain passage. The cup is a vessel having an imperforate bottom capable of holding liquid.

Above the goblet and at the junction of the top extensions 12 and 13, there is a hollow hook 26. As shown in Fig. 3 this hook 26 is operatively suspended from the tubular extension 12. The circular portion of the hook 26 has an upwardly directed hole 27 by which liquid may be discharged through the hook.

A spray ring 28 is suspended by means of a yoke 29 from the hook 26. The yoke 29 has a hole 30 which rests upon and registers with the hole 27 of the hook 26. The yoke is extended to form perforated semi-circular arcs 31, 31 from which the liquid is discharged. Suitable lugs 32 are formed on the outside of the arcs 31.

A wire frame 33 is provided with its upper ring suitably resting upon the lugs 32.

The outer surface of the frame 33 carries a large number of pendant elements 34 which in the present instance represent individual grapes. As shown in Fig. 6 these pendant elements are suitably suspended from the rings of the frame by means of wire, bends of the frame, or the like.

The spraying parts of the spray ring and frame are provided with an ornamental cover 35 which in the present instance simulates two or more grape leaves.

In the hollow base 7 there is provided a reservoir 36. This reservoir is connected to the bottom of the tubular post 9 from which it receives the drainage. A delivery pipe 37 is connected to the reservoir and leads to a pump 38. The pump 38 in turn discharges into the base of the tubular post 8.

An electric motor 39 or its equivalent is carried in the base and connected by means of belt 40 or otherwise to the pump 38.

Suitable switch means, not illustrated, will provide for operating the motor 39. This operation may be continuous or optionally intermittent by the use of conventional circuit interrupters.

In the practical operation of this device the observer will see only a draped stand on which rests a tray with a goblet. From a point on the stand above the goblet there is hung a simulated fruit. Clear liquid similar to the juice of the selected fruit will appear to drip from the latter into the goblet constantly or intermittently. Despite the consequential flow of liquid the goblet will never overflow. The curiosity of the observer will be awakened to explain both the source of the juice and its removal without overflowing the apparently full goblet.

While I have illustrated and described the preferred form of the invention, suitable latitude as to appearance, proportions and minor details is of course within the scope of the invention as defined in the following claims.

What I claim is:

1. A display device having in combination, a base, a supporting structure thereon, a goblet having a hollow stem mounted on the structure, a cup having an imperforate bottom completely housed in the goblet and closely spaced therefrom, a decorative element suspended from the structure above and draining into the goblet, a pump in the base and passageways connecting the pump with the hollow stem of the goblet and with the decorative element.

2. A display device having in combination, a base, a supporting structure thereon, a goblet having a hollow stem mounted on the structure, a cup having an imperforate bottom completely housed in the goblet and closely spaced therefrom, a spray-ring suspended from the structure above the goblet, a decorative element depending from the said ring and draining into said cup, a pump in the base and passageways connecting the pump with the hollow stem of the goblet and with the spray ring.

3. A display device having in combination, a base, a supporting structure thereon, a goblet having a hollow stem mounted on the structure, a cup having an imperforate bottom completely housed in the goblet and closely spaced therefrom, a tubular hook forming part of the structure above the goblet, a tubular spray ring suspended from the hook and connected therewith, to receive liquid therefrom, a decorative element depending from the said ring and draining into said cup, a pump in the base, and passageways connecting the pump with the hollow stem of the goblet and with the spray ring.

4. A display device having in combination, a base, a plurality of corner posts with top extensions, one of said posts with its extension forming a feed pipe, intermediate cross bars between the posts, one of said bars and a second post being hollow and forming a discharge conduit, a tray supported on the intermediate bars, a goblet mounted on the tray with its stem hollow and connecting with the hollow cross bar, a cup having an imperforate bottom completely housed in the goblet and closely spaced therefrom, a hollow hook operatively attached to the feed pipe extension, a hollow yoke suspended from the hook and connected with the passageway in the hook, to receive liquid therefrom, semicircular hollow extensions on the yoke, a decorative element surrounding the yoke extension in position to drain into said cup and simulating a bunch of grapes, and means in the base for circulating a liquid through the piping, the yoke and the goblet.

5. A display device having in combination, a base, a plurality of corner posts with interconnected top extensions, one of said posts with its extension forming a feed pipe, a plurality of cross-connected intermediate bars between the posts, one of said bars and a second post being hollow and forming a discharge conduit, a tray supported on the intermediate bars, a goblet mounted on the tray with its stem hollow and connecting with the hollow crossbar, a cup having an imperforate bottom completely housed in the goblet and closely spaced therefrom, a hollow hook suspended from the feed pipe extension and receiving liquid therefrom, a hollow yoke suspended from the hook and connected with the passageway in the hook and receiving liquid therefrom, semicircular hollow extensions on the yoke, a decorative element surrounding the yoke extensions in position to drain into said cup and simulating a bunch of grapes, a cover for the said extensions, and means in the base for circulating a liquid through the piping, the yoke and the goblet.

6. A display device having in combination, a base, a supporting structure thereon, a goblet having a hollow stem mounted on the structure, a cup having an imperforate bottom completely housed in the goblet and closely spaced therefrom, a decorative element suspended from the structure above the goblet in position to drain into said cup, a pump in the base, passageways connecting the pump with the hollow stem of the goblet and with the decorative element and intermittently operating motor means for the pump.

GEORGE H. DOWSING.

REFERENCES CITED

The following references are of record in the file of this patent:

UNITED STATES PATENTS

| Number | Name | Date |
|---|---|---|
| 538,820 | Cunningham | May 7, 1895 |
| 2,123,892 | Grady | July 19, 1938 |

FOREIGN PATENTS

| Number | Country | Date |
|---|---|---|
| 113,452 | Australia | July 8, 1941 |